United States Statutory Invention Registration [19]

[11] Reg. Number: H711

Harada et al. [43] Published: Nov. 7, 1989

[54] EXPOSURE DEVICE

[75] Inventors: Kiyoshi Harada; Kazuo Takahashi; Mikio Kawasaki, all of Hino, Japan

[73] Assignee: Konica Corporation, Japan

[21] Appl. No.: 209,417

[22] Filed: Jun. 20, 1988

[30] Foreign Application Priority Data

Jun. 23, 1987 [JP] Japan ..... 62-156036

[51] Int. Cl.[4] ..... G03B 27/54
[52] U.S. Cl. ..... 355/67
[58] Field of Search ..... 362/23, 84, 217, 260, 362/800

[56] References Cited

U.S. PATENT DOCUMENTS

| | | | |
|---|---|---|---|
| 2,644,113 | 6/1953 | Etzkorn | 362/260 X |
| 4,144,557 | 3/1979 | Kerr, III et al. | 362/84 |
| 4,570,207 | 2/1986 | Takahashi et al. | 362/800 X |

*Primary Examiner*—Harold J. Tudor
*Assistant Examiner*—Michael J. Carone
*Attorney, Agent, or Firm*—Jordan B. Bierman

[57] ABSTRACT

An exposure device for printing an image on a photographic material having a tabular-shaped light emitting means as a light source is disclosed. The exposure device has neither exposure unevenness nor can the light source be suddenly cut off in use and is suitable for printing an identification mark on medical films.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EXPOSURE DEVICE

FIELD OF THE INVENTION

This invention relates to an exposure device and particularly to an exposure device suitable for printing an identification mark (or an ID mark) on medical films, being used in a miniaturized printer and so forth.

BACKGROUND OF THE INVENTION

Heretofore, point light sources such as an incandescent lamp, a tungsten lamp and so forth have commonly been used.

Exposure devices using the point sources have had such a disadvantage that an exposure unevenness has been apt to occur between the center and the corners of an image. With the purpose of covering the disadvantage, a complicated optical system has been used or a spatial distance has been provided between a light source and an irradiative surface so as to change, as much as possible the light emitted from the point source into a light as if it were emitted from a surface light source. Nevertheless, a device has been unavoidable to be enlarged in size. Further, the point sources such as an incandescent lamp, a tungsten lamp and so forth have a possibility to be cut off suddenly in use, due to the expiration of life. If this is the case happened in a hospital, for example, medical films are developed without printing any ID marks such as patients' names, so that there raises a serious problem that a subject patient cannot be identified later by the developed film, and vice versa.

SUMMARY OF THE INVENTION

This invention has been made by taking the above-mentioned problems into consideration.

It is, therefore, an object of the invention to provide an exposure device which has neither exposure unevenness nor such a danger as a sudden cutting off of light source in use and is capable of miniaturizing the device in size.

The above-mentioned object of the invention is achieved by an exposure device for printing an image on a photographic material having a tabular-shaped light emitting means as a light source.

DETAILED DESCRIPTION OF THE INVENTION

There is no special limitation to the tabular-shaped light emitting means which may be used as the light sources for the exposure device of the invention, provided that they have a tabular-shaped light emitting surface capable of emitting almost uniform rays of light. Those light emitting means preferably applicable to the invention include, for example, an electroluminescent illuminant (hereinafter called an EL), a flat type fluorescent lamp, a light emitting diode module and so forth. The flat type fluorescent lamp is a kind of lamps that irradiates rays of light from a fluorescent substance coated over to the inner surface of a tabular-shaped glass vacuum tube, by a glow discharge. Among these lamps, those of the cold cathode type should preferably be used. The light emitting diode module is a kind of modules having a plurality of light emitting diodes each arranged to a flat surface so as to obtain a uniform light emitting surface. In the tabular-shaped light emitting means of the invention, any emission spectrum may be arbitrarily selected so as to meet the characteristics of a light-sensitive material used.

Now, the invention will be described in detail with reference to the following examples in which an EL was used. As described above, it is to be understood that the light sources of the invention shall not be limited thereto.

ELs are classified into a direct-current type (or a D.C. type) and an alternating-current type (or A.C. type), by the driving systems and, further, they are classified into a thin-film type and a dispersion-type, by the luminous layer construction system.

There is no special limitation to the ELs applicable to the invention, but any ELs are applicable.

Figure 1:
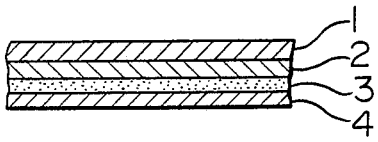
FIG. 1 is a sectional view showing an example of thin-film type ELs.

FIG. 1 shows a sectional view of an example of the thin-film type ELs, wherein reference numeral 1 is a transparent substrate, 2 is a transparent electrode, 3 is a luminous thin film and 4 is a counter electrode. Commonly, a glass plate is used as transparent substrate 1 and an aluminium plate as a counter electrode 4, respectively. Luminous thin film 3 is formed, in such a method as a vacuum deposition, a spattering or the like, over to transparent substrate 1 bearing transparent electrode 2 thereon. The luminous member of an EL, i.e., a fluorescent substance, has commonly a zinc sulfate as the fluorescent matrix thereof. The fluorescent matrix is doped with such a metal as manganese, copper or the like, that is called an activator, which determines an emission spectrum. The thin-film type EL shown in FIG. 1 is only an example and, besides, there are many disclosures of ELs having various structures.

There is a detailed description of ELs in Sumiaki Ibuka, 'Actual Techniques for Application of Electroluminescent Material, Part 1 to Part 3', Function & Material, Vol 7, No. 9, P. 43, No. 10, p. 44 and No. 11, p. 44, (1987).

A dispersion type EL has a luminescent layer containing a fluorescent substance held in a dispersed state in a binder comprising commonly a synthetic resin. The fundamental structure thereof is similar to that of the thin-film type EL shown in FIG. 1.

A variety of colors of light emitted from ELs, that is, various emission spectra thereof may be obtained according to the kinds of metal used as an activator or by mixing up various kinds of fluorescent substances together.

Further, for example, when two ELs each having the different emission spectra are brought into close contact back to back with each other, it may be used as a light source compatibly applicable to two different wavelength regions when only the direction of the EL is changed.

The exposure device of the invention having an EL as the printing light source thereof may be universally used as ordinary exposure devices and, particularly, as an ID mark printer for medical films, a miniature-sized printer and so forth.

Any light-sensitive materials may be printed by the exposure device of the invention, provide that the light-sensitive materials are light-sensitive to the emission wavelength region of the EL of the exposure device of the invention. For example, silver halide photographic light-sensitive materials should preferably be used.

The exposure device of the invention may also be applied with a filter, an optical system and so forth.

EXAMPLES

The typical embodiments of the invention will now be described below. It is, however, to be understood that the invention shall not be limited to these embodiments.

Figure 2:
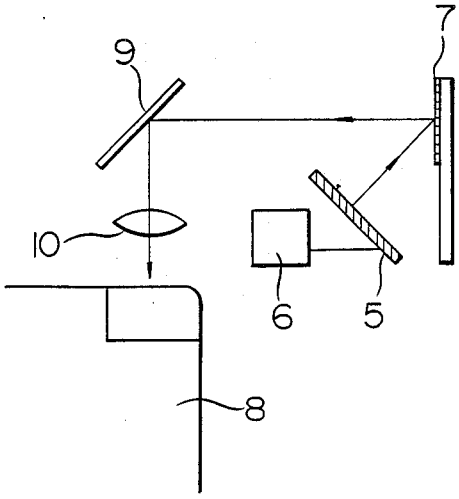
FIGS. 2, 3 and 4 each are the schematic sectional views showing the examples of the invention, respectively.

FIG. 2 is a schematic sectional view showing the first example of the invention. This example is shown for the case that an ID mark is printed on a medical film.

In the drawing, reference numeral 5 indicates an EL emitting white light; 6 is an A.C. electric power source; 7 is an identification card (or, an ID card) recorded thereon a patient's name or the like; 8 is a medical X-ray film on which the chest of a patient or the like is photographed by a camera (not shown); 9 is a mirror; and 10 is a lens.

In such a structure as shown in the drawing, an ID content such as the name of a patient and the like each recorded on an ID card 7 are printed on the corner portion of X-ray film 8 by EL 5.

There is no exposure unevenness occurred, because EL 5 is a uniformly emittable surface light source. Different from a point light source, EL 5 has not any danger at all of a sudden cutting off caused by its life expiration. EL 5 may be deteriorated gradually in luminance by its own characteristics though, such a deterioration may well be counter-checked in advance by replacing the EL if a darkened emission is found by judging a final image printed on an X-ray film. Also, when using an EL comprising two ELs brought into close contact back to back with each other to serve as EL 5, there is such an advantage that, if one of the ELs is deteriorated, it may simply be replaced by changing the direction of EL 5. Further, EL 5 has a spatial advantage and may be miniaturized in size, because it is a thin surface light source.

Figure 3:
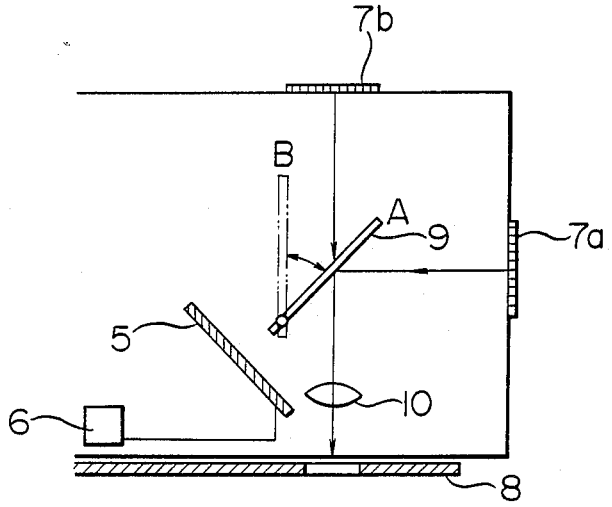

FIG. 3 is a schematic sectional view showing the second example of the invention. This is another example for the case of printing an ID mark on a medical film. In the drawing, like reference numerals indicates like or corresponding parts shown in FIG. 2. Therefore, the description thereof are omitted herefrom.

In this example, the identification contents of two ID cards *7a* and *7b* may be printed on X-ray film 8, when the position of mirror 9 is changed from A to B.

Figure 4:
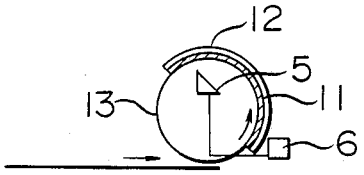

FIG. 4 is a schematic sectional view showing the third example of the invention. This is a further example for the case of applying the invention to a duplicator for duplicating a film.

In FIG. 4, 13 is a rotatable transparent cylindrical member. Original film 11 and duplicating film 12 are set to the circumferential surface of the cylindrical member 13. EL 5 is provided to the inside of and in the axial direction of the cylindrical member 13, and an image of original film 11 is printed on duplicating film 12. In the drawing, 6 is an A.C. power source.

Figure 5:
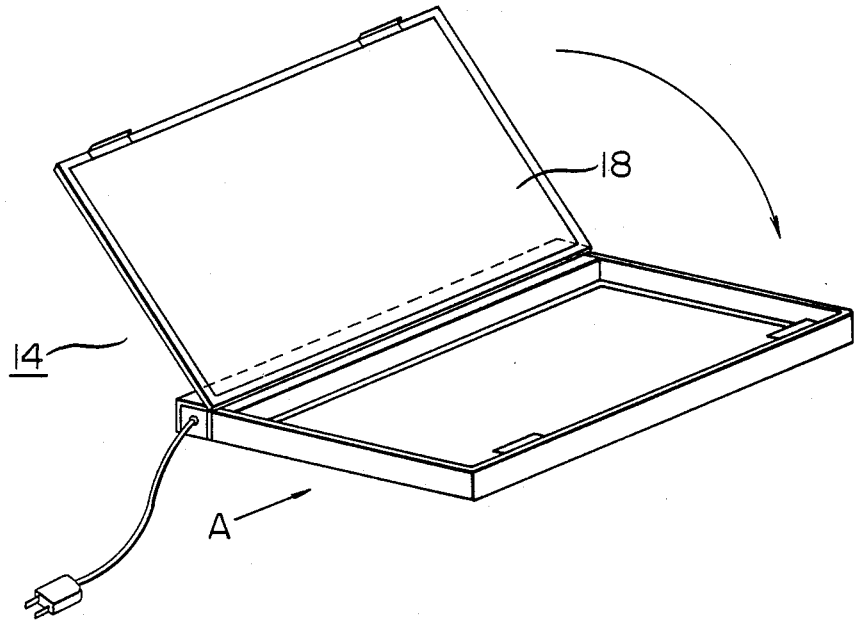
FIG. 5 is a perspective view showing an example of the invention.
Figure 6:
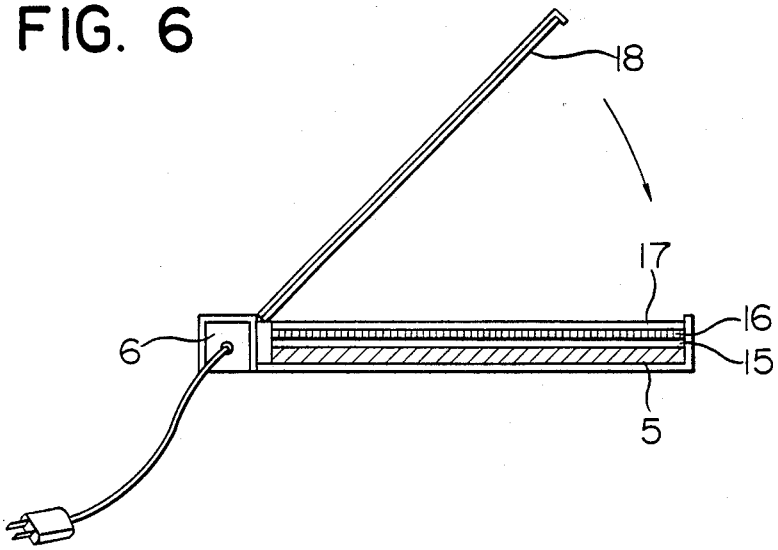
FIG. 6 is a sectional view of the example of FIG. 5 shown from direction A.

FIG. 5 is a perspective view showing the fourth example of the invention; and FIG. 6 is a sectional view of the fourth example shown from the direction of A.

These are still further examples for the case of applying the invention to a cassette type printer for duplicating a film or the like.

In the drawings, EL 5 is arranged to the bottom of cassette 14 and thereon diffusing plate 15 is placed. Original film 16 and duplicating film 17 are set and top cover 18 is then closed. When A.C. power source 6 is switched ON, EL 5 emits light and an image on original film 16 is printed on duplicating film 17. Further, a light-controller (not shown) is connected to A.C. power source 6, so that a light quantity may be adjusted.

As is described above, according to the exposure device of the invention, any exposure unevenness may be eliminated and a light source may not be cut off in use and, further, the device may be miniaturized in size.

What is claimed is:

1. A method of printing an image on a photographic material wherein said photographic material is exposed to an image with an exposure light comprising a tabular-shaped light emitting means.

2. The method of claim 1 wherein said tabular-shaped light emitting means comprises an electro-luminescent illuminant.

3. The method of claim 1 wherein said tabular-shaped light emitting means comprises a flat fluorescent lamp.

4. The method of claim 1 wherein said tabular-shaped light emitting means comprises a light emitting diode module.

* * * * *